United States Patent
Bittner

(10) Patent No.: US 12,004,504 B2
(45) Date of Patent: Jun. 11, 2024

(54) SYSTEMS AND METHODS FOR CONTROLLING A NOZZLE ASSEMBLY OF AN AGRICULTURAL APPLICATOR

(71) Applicant: CNH Industrial America LLC, New Holland, PA (US)

(72) Inventor: Roy A. Bittner, Cato, WI (US)

(73) Assignee: CNH Industrial America LLC, New Holland, PA (US)

( * ) Notice: Subject to any disclaimer, the term of this patent is extended or adjusted under 35 U.S.C. 154(b) by 431 days.

(21) Appl. No.: 17/216,800

(22) Filed: Mar. 30, 2021

(65) Prior Publication Data
US 2021/0368770 A1 Dec. 2, 2021

Related U.S. Application Data

(60) Provisional application No. 63/032,032, filed on May 29, 2020.

(51) Int. Cl.
*A01M 7/00* (2006.01)
*A01C 23/00* (2006.01)
*A01C 23/04* (2006.01)

(52) U.S. Cl.
CPC ......... *A01M 7/0089* (2013.01); *A01C 23/007* (2013.01); *A01C 23/047* (2013.01); *A01M 7/0042* (2013.01)

(58) Field of Classification Search
CPC .............. A01M 7/0042; A01M 7/0057; A01M 7/0089; A01C 23/007; A01C 23/0047
(Continued)

(56) References Cited

U.S. PATENT DOCUMENTS

| 4,186,878 A | 2/1980 | Lestradet |
| 6,202,013 B1 | 3/2001 | Anderson et al. |

(Continued)

FOREIGN PATENT DOCUMENTS

| CN | 104330279 A | 2/2015 |
| CN | 108152071 A | 2/2015 |

(Continued)

OTHER PUBLICATIONS

Thomas-Murphy, Jenn, "Mobile Applications", Field Crops, Cornell CALS, dated 2021, (4 Pages) https://fieldcrops.cals.cornell.edu/tools-resources/mobile-apps/.
(Continued)

*Primary Examiner* — Steven J Ganey
(74) *Attorney, Agent, or Firm* — Rebecca L. Henkel; Peter K. Zacharias; Rickard K. DeMille

(57) ABSTRACT

An agricultural sprayer system is provided herein that can include a boom assembly having a frame and a boom arm operably coupled with the frame at one end portion thereof. Outer and inner nozzle assemblies can each be supported by the boom arm. The inner nozzle assembly is inboard of the outer nozzle assembly. A sensor can be operably coupled with the boom assembly and configured to capture data associated with the boom arm. A computing system can be communicatively coupled to the sensor. The computing system can be configured to calculate a boom arm movement from a default axis based on the data from the sensor and regulate the outer and inner nozzle assemblies at differing flow rates when the movement exceeds a predefined range.

19 Claims, 6 Drawing Sheets

(58) Field of Classification Search
USPC .................. 239/159, 172, 551, 69, 71, 73
See application file for complete search history.

(56) References Cited

U.S. PATENT DOCUMENTS

| | | | |
|---|---|---|---|
| 6,454,294 B1 | 9/2002 | Bittner et al. | |
| 7,752,779 B2 | 7/2010 | Schoenmaker et al. | |
| 8,191,795 B2 * | 6/2012 | Grimm | A01M 7/0089 239/69 |
| 9,382,003 B2 | 7/2016 | Burema et al. | |
| 9,994,307 B2 | 6/2018 | Nguyen et al. | |
| 10,095,235 B2 | 10/2018 | Sugumaran et al. | |
| 10,244,747 B2 | 4/2019 | Leeb et al. | |
| 10,252,285 B2 | 4/2019 | Barker et al. | |
| 2006/0265106 A1 * | 11/2006 | Giles | A01B 79/005 700/283 |
| 2013/0068892 A1 | 3/2013 | Bin Desa et al. | |
| 2016/0255769 A1 * | 9/2016 | Leeb | A01C 23/047 |
| 2017/0027103 A1 * | 2/2017 | Grotelueschen | A01M 7/0057 |
| 2017/0131718 A1 | 5/2017 | Matsumura et al. | |
| 2017/0305537 A1 | 10/2017 | Smith et al. | |
| 2018/0156770 A1 | 6/2018 | Saez et al. | |
| 2018/0364157 A1 | 12/2018 | Ghiraldi et al. | |
| 2021/0127567 A1 | 5/2021 | Loukili et al. | |

FOREIGN PATENT DOCUMENTS

| | | |
|---|---|---|
| CN | 204236769 | 4/2015 |
| CN | 107235146 A | 10/2017 |
| CN | 107907365 A | 4/2018 |
| CN | 107963214 A | 4/2018 |
| EP | 3235380 | 10/2017 |
| EP | 3372078 | 9/2018 |
| GB | 2457388 | 8/2009 |
| GB | 2521343 | 5/2018 |

OTHER PUBLICATIONS

"SenseFly", Agriculture, Parrot Group, Apr. 5, 2019, (11 pages) https://www.sensefly.com/industry/agriculture/.

* cited by examiner

SYSTEMS AND METHODS FOR CONTROLLING A NOZZLE ASSEMBLY OF AN AGRICULTURAL APPLICATOR

CROSS-REFERENCE TO RELATED APPLICATION

This application is a non-provisional application claiming the benefit of priority under 35 U.S.C. § 119(e) to U.S. Provisional Application No. 63/032,032, filed May 29, 2020, which is hereby incorporated by reference in its entirety.

FIELD

The present disclosure relates generally to agricultural applicators, such as agricultural sprayers and, more particularly, to systems and methods for monitoring a boom assembly during an application operation and controlling various operations of the boom assembly based on the data generated while monitoring the boom assembly.

BACKGROUND

Various types of work vehicles utilize applicators (e.g., sprayers, floaters, etc.) to deliver an agricultural product to a ground surface of a field. The agricultural product may be in the form of a solution or mixture, with a carrier (such as water) being mixed with one or more active ingredients, such as a pesticide(s) (e.g., an herbicide(s), insecticide(s), rodenticide(s), etc.) and/or a nutrient(s).

The applicators may be pulled as an implement or self-propelled, and can include a tank, a pump, a boom assembly, and one or more nozzle assemblies carried by the boom assembly at spaced apart locations. The boom assembly can include a pair of boom arms, with each boom arm extending to either side of the applicator when in an unfolded state. Each boom arm may include multiple boom segments, with each boom segment capable of being associated with a number of nozzle assemblies. Each nozzle assembly typically includes a spray nozzle and an associated nozzle valve to regulate the output of the spray nozzle. With such configurations, a product pump is configured to supply an agricultural product through a pump line to individual boom arm lines coupled in parallel to the pump line, with each boom arm line being coupled in parallel to the respective spray nozzles of such boom segment to allow the agricultural product to be supplied to each spray nozzle.

During an application operation, however, various factors may affect a quality of application of the agricultural product to the field. For instance, boom arm movement of the boom assembly while the vehicle moves along the field may lead to inconsistent application of the agricultural product. Accordingly, an improved system and method for monitoring the quality of application of the agricultural product to the field by monitoring movement of the boom assembly would be welcomed in the technology.

BRIEF DESCRIPTION

Aspects and advantages of the invention will be set forth in part in the following description, or may be obvious from the description, or may be learned through practice of the invention.

In some aspects, the present subject matter is directed to an agricultural sprayer system that can include a boom assembly having a frame and a boom arm operably coupled with the frame at one end portion thereof. Outer and inner nozzle assemblies can each be supported by the boom arm. The inner nozzle assembly is inboard of the outer nozzle assembly. A sensor can be operably coupled with the boom assembly and configured to capture data associated with the boom arm. A computing system can be communicatively coupled to the sensor. The computing system can be configured to calculate a boom arm movement from a default axis based on the data from the sensor and regulate the outer and inner nozzle assemblies at differing flow rates when the movement exceeds a predefined range.

In some aspects, the present subject matter is directed to an agricultural sprayer system that can include a boom assembly having a frame and a boom arm operably coupled with the frame. A nozzle assembly can be supported by the boom arm. A sensor can be operably coupled with the boom arm and can be configured to capture data associated with a position of the boom arm. A computing system can be communicatively coupled to the sensor. The computing system can be configured to calculate a boom arm movement from a default axis based on the data from the sensor and regulate the nozzle assembly at first flow rate when the boom arm movement is within a predefined range and a second flow rate when the boom arm movement deviates from a predefined range.

In some aspects, the present subject matter is directed to a method for operating an agricultural applicator. The agricultural applicator can comprise a boom arm including at least outer and inner nozzle assemblies separated along the boom arm. The method can include controlling an operation of a product pump to supply agricultural product to the outer and inner nozzle assemblies. The method can also include controlling an operation of a nozzle valve of the outer nozzle assembly to regulate a first flow rate of the agricultural product through the outer nozzle assembly. The method can further include controlling an operation of a nozzle valve of the inner nozzle assembly to regulate a second flow rate of the agricultural product through the inner nozzle assembly. In addition, the method can include receiving, with a sensor, data indicative of a boom arm movement in a fore-aft direction from a default axis. Lastly, the method can include altering at least one of the first flow rate or the second flow rate of the agricultural product when the movement of the boom arm deviates from a predefined range.

These and other features, aspects, and advantages of the present technology will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present technology, including the best mode thereof, directed to one of ordinary skill in the art, is set forth in the specification, which makes reference to the appended figures, in which.

Figure 3:
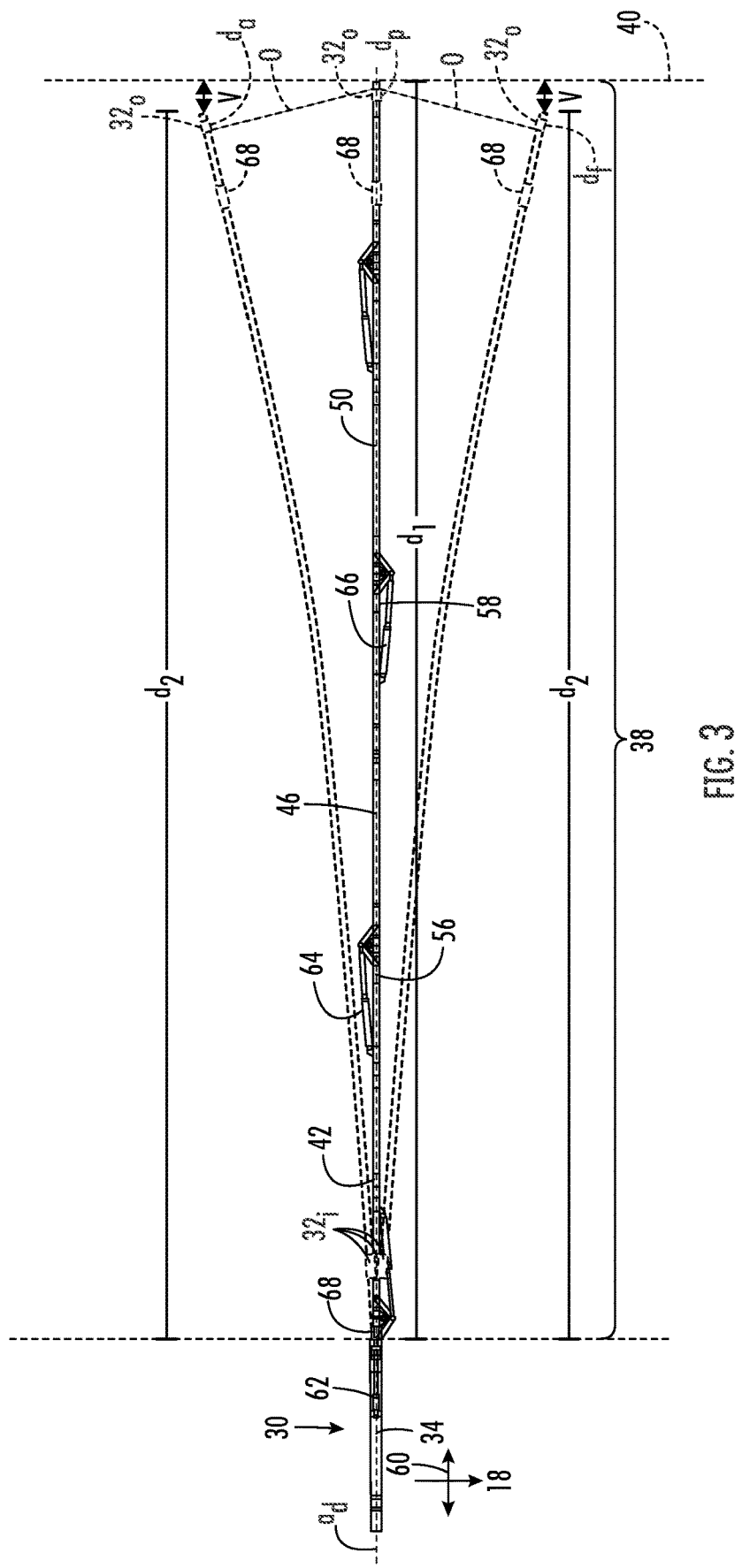
Figure 4:
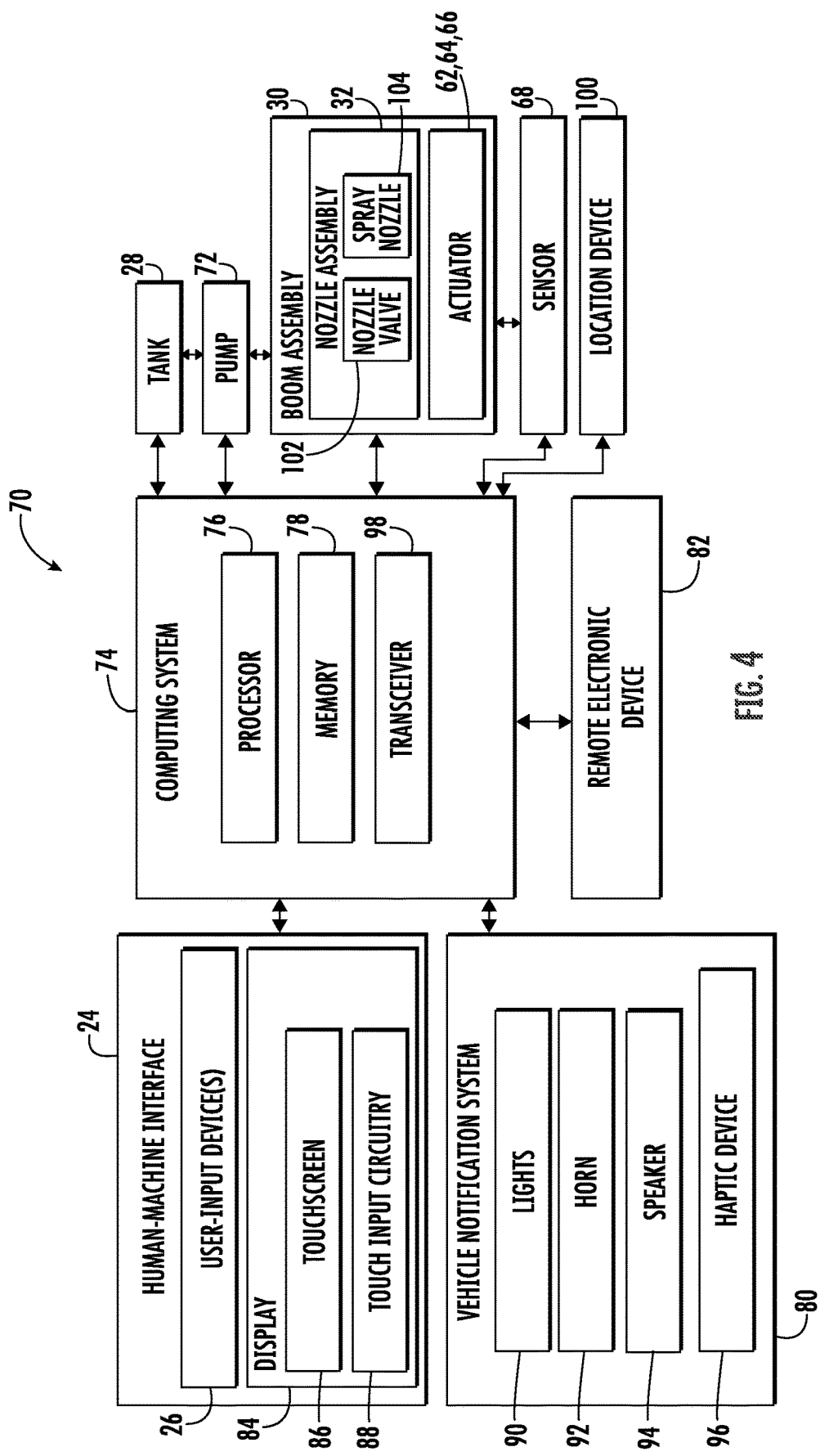
Figure 5:
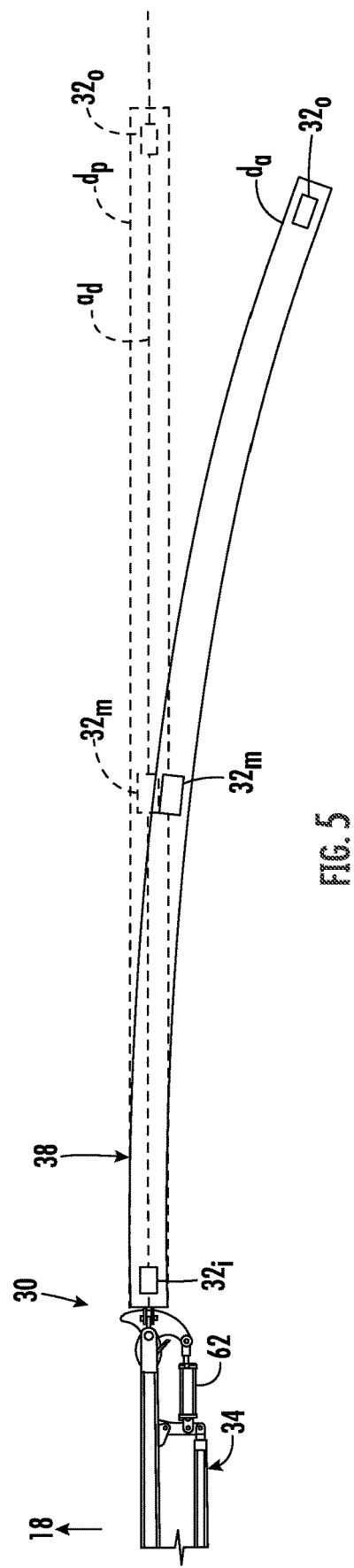
Figure 6:
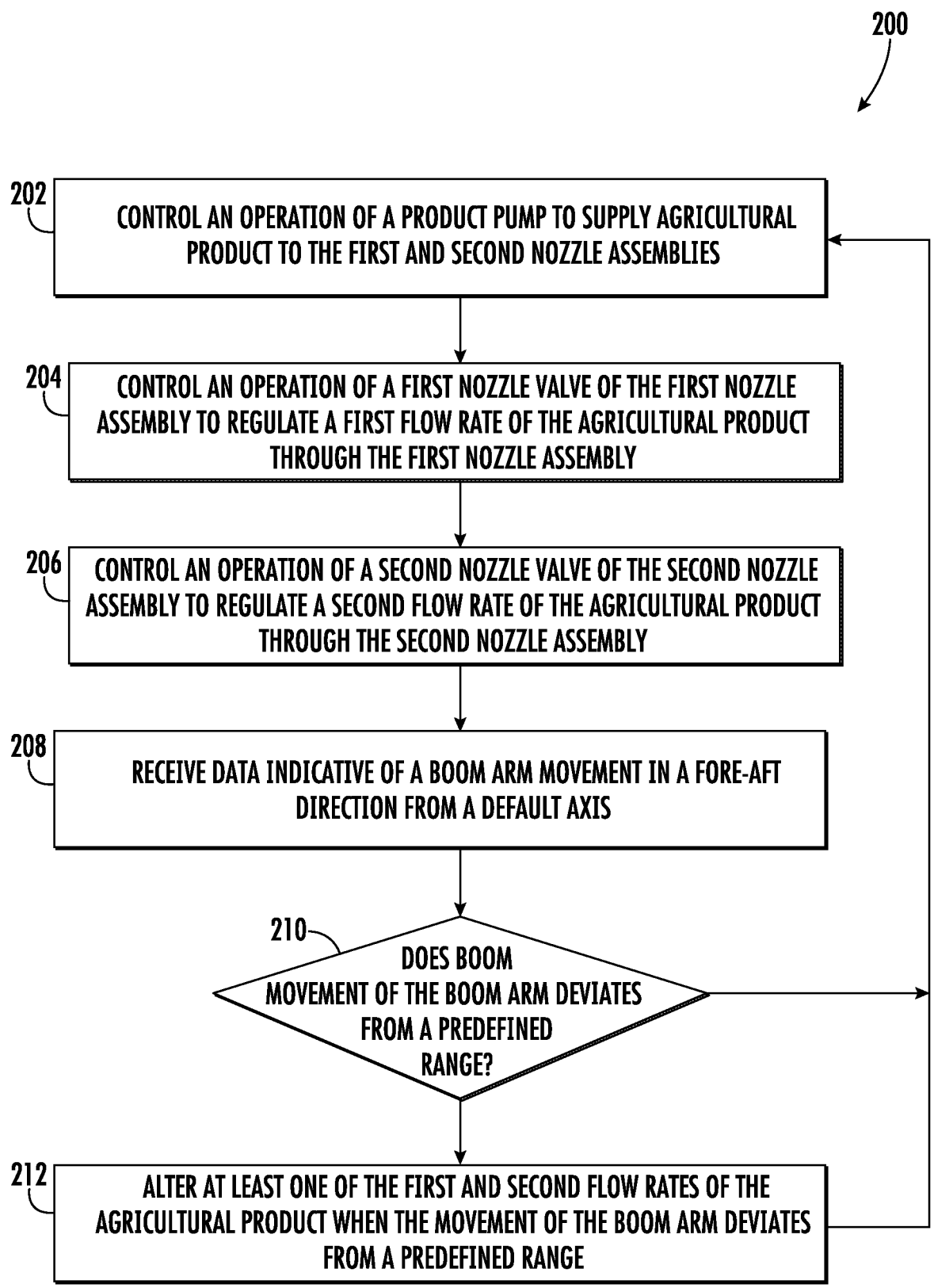

FIG. 3 illustrates a simplified, schematic view of some embodiments of a boom arm of a boom assembly in accordance with aspects of the present subject matter, particularly illustrating the boom arm being deflected in a forward and a rearward direction; and FIG. 4 illustrates a block diagram of components of a system for monitoring the boom assembly during an application operation in accordance with aspects of the present subject matter;

FIG. 5 a simplified, schematic view of some embodiments of a product application system in accordance with aspects of the present subject matter, particularly illustrating the system including various nozzle assemblies operable at varied flow rates; and FIG. 6 illustrates a flow diagram of some embodiments of a method for operating an agricultural applicator in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of some embodiments can be used with another embodiment to yield a still further embodiment. Thus, it is intended that the present invention covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to systems and methods for monitoring a boom assembly of a sprayer during an application operation and controlling various operations of the boom assembly, such as by making an adjustment to one or more operating parameters associated with the operation of the boom assembly based on the data generated while monitoring the boom assembly.

In several embodiments, the boom assembly may be configured to couple with a work vehicle, such as a sprayer. The boom assembly can include a frame and one or more boom arms. Each boom arm supports a plurality of nozzle assemblies spaced apart along the boom arm. In several embodiments, the boom arms are rotatable relative to the frame between a plurality of angles in a fore-aft direction by an actuator coupled with the frame and one of the boom arms. For instance, the plurality of angles can include a storage angle when one or both of the boom arms are positioned in a folded, inoperable position. One or both of the boom arms can also be rotated to a default position relative to the frame in which one or both of the boom arms define a default axis from the frame for operative use of the boom arm.

During an application operation, various forces may cause the boom arms to move in a vertical direction, a fore-aft direction (i.e., a direction of travel), and/or a combination thereof from the default position. For instance, a portion of the boom assembly may be deflected (moved from an assumed or default position) due to dynamic forces encountered when the sprayer is turned, accelerated, or decelerated. In addition, terrain variations and weather variances may also cause deflection of the boom assembly. Further, a portion of the boom assembly may come in contact with an object thereby leading to deflection of the boom assembly. Moreover, as ever larger spray booms and faster ground speeds by the sprayer are implemented during the application operation, even greater amounts of deflection may be experienced. Another contributor to deviation can be the introduction of boom yaw control, wherein a boom hinge position is purposefully controlled to reduce boom stress, which further moves the nozzles from their assumed or default positions.

When the boom arms deflect in the fore-aft direction, portions of the boom arm and the nozzle assemblies positioned along the boom arm are offset from their positions when compared to the default position, which occurs when the boom arm is free of deflection. A deflection magnitude or offset in position of the individual nozzle assemblies along the boom arm due to the deflection relative to their assumed position can lead to misapplication of the agricultural product as many application routines use the assumed or default position of the nozzle assemblies. Further, since the boom arm is in a cantilevered orientation, the portion of the boom arm that is proximate to the anchor point will deflect less from the default axis than a portion of the boom arm that is further from the anchor point. Therefore, as the boom arm is deflected from the default axis, an outer nozzle assembly will have a greater deflection magnitude from its default position than an inner nozzle assembly that is closer to the anchor point. Due to the varied deflection magnitudes along the boom arm, an acceleration of an inner nozzle assembly will be less than an intermediate nozzle assembly, which in turn, will be less than a speed of the outer nozzle assembly once the deflective force is overcome and/or no longer present, the boom arm will return to its default position.

To monitor the movement of the boom assembly, a sensor is operably coupled with the boom assembly. The sensor may be configured to provide data related to a portion of the boom assembly. A computing system is communicatively coupled to the sensor. Upon receiving data from the sensor, the computing system can determine a boom arm movement from a default axis and regulate the various nozzle assemblies at a generally common flow rate when the boom arm movement is within a predefined range and at differing flow rates when the boom arm movement exceeds the predefined range. As used herein, boom arm movement may be any metric of measurement that determines that at least a portion of the boom arm has deviated from the default position, which may be detected by determining that the boom arm has moved from the default axis by a deflection magnitude at any point along the boom arm or that a portion of the boom arm is experiencing an acceleration/deceleration that is varied from that of the frame and/or the sprayer.

Once the boom arm movement remains within the predefined range for a defined period of time or once the boom arm has crossed the default axis a predefined number of times, each the nozzle assemblies may return to a generally common flow rate or to the original, first flow rate of any of the nozzle assemblies. By altering the flow rates of the nozzle assemblies based on movement of the one or more boom arms, a more precise application may be completed by the sprayer, thereby reducing misapplication of the agricultural product across a field.

Figure 1:
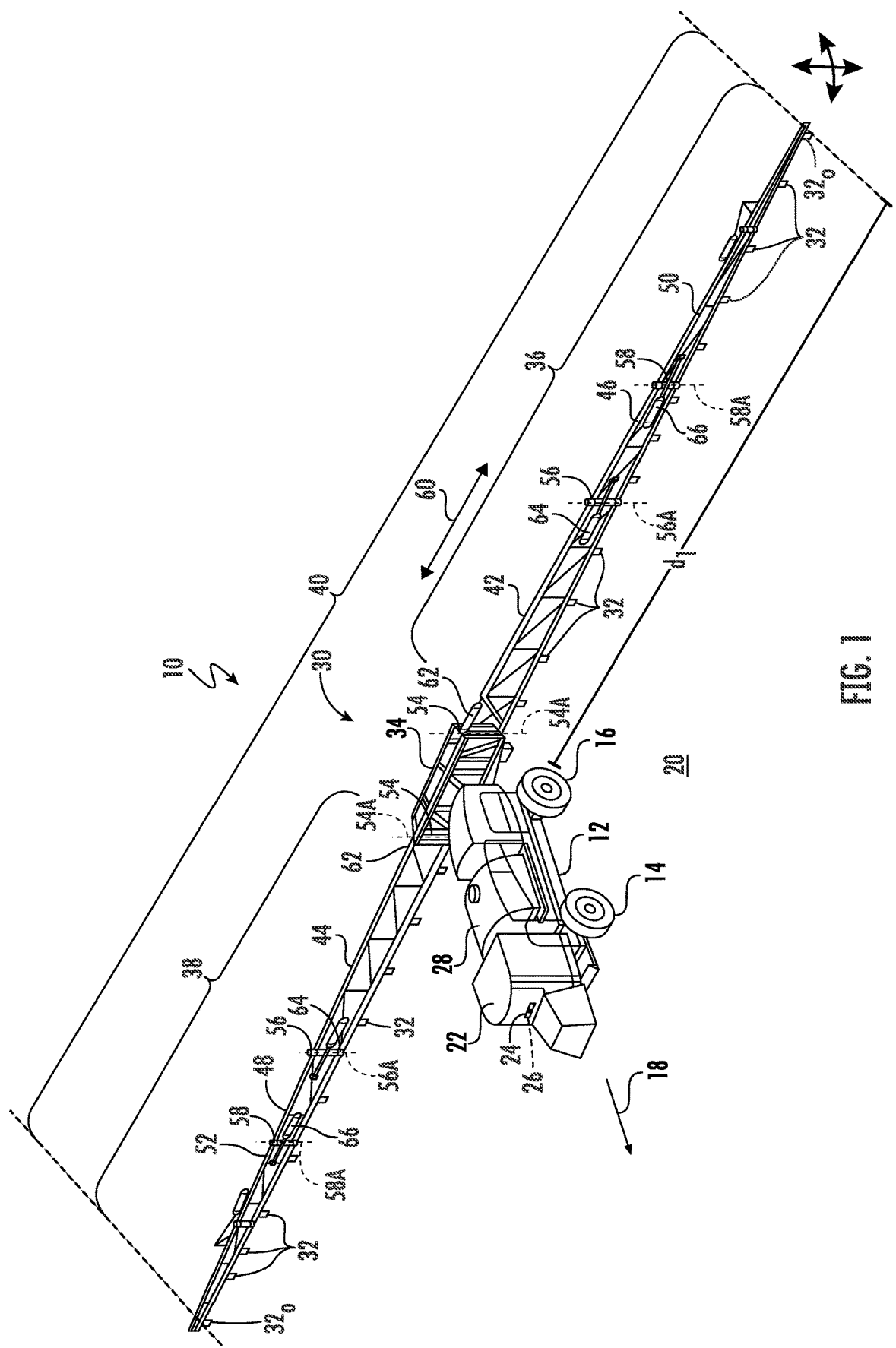
FIG. 1 illustrates a perspective view of some embodiments of an agricultural applicator in accordance with aspects of the present subject matter.
Figure 2:
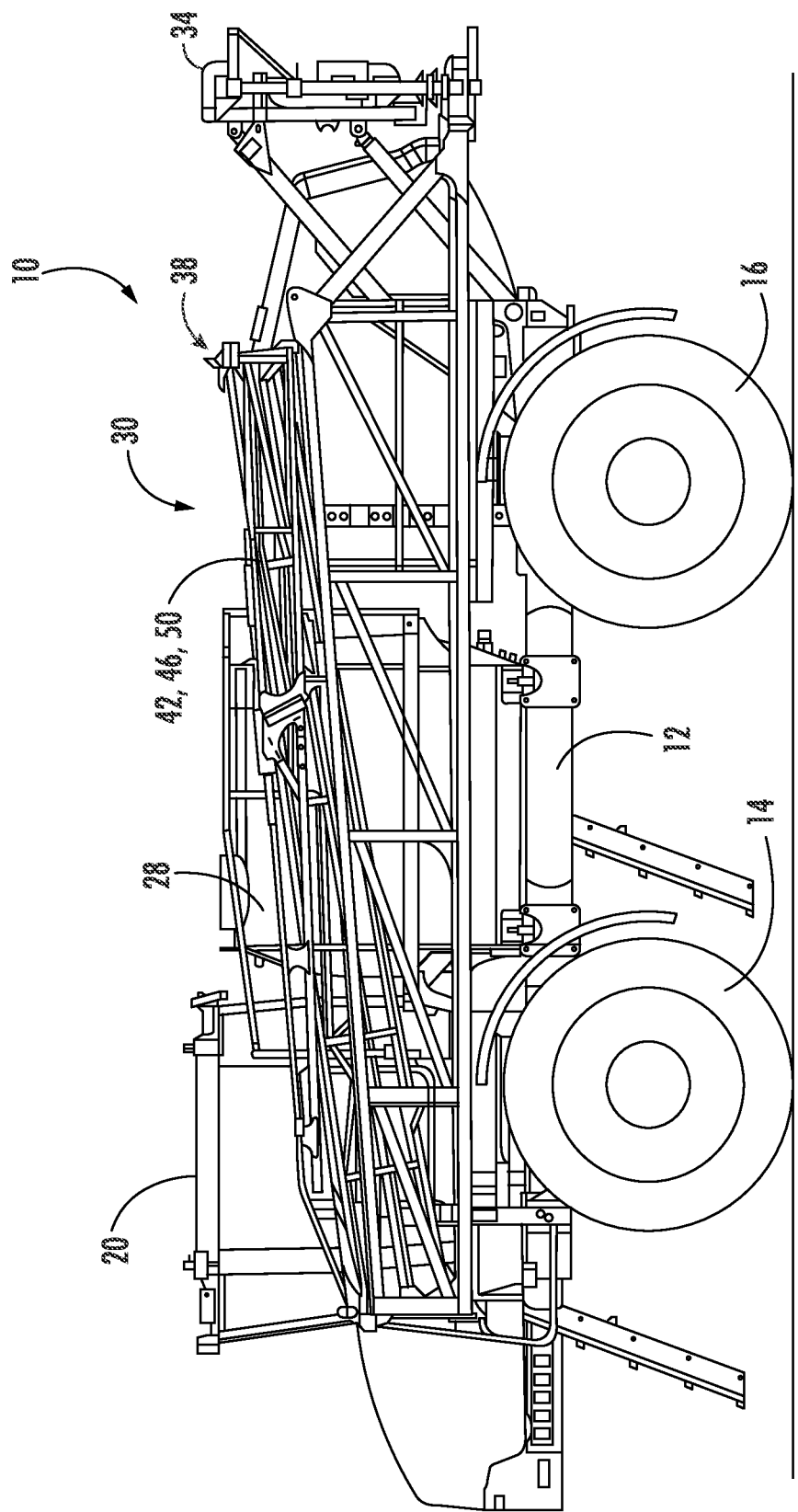
FIG. 2 illustrates a side view of the applicator shown in FIG. 1 in accordance with aspects of the present subject matter, particularly illustrating the applicator in a transport position.

Referring now to FIGS. 1 and 2, an agricultural applicator is generally illustrated as a self-propelled agricultural sprayer 10. However, in alternative embodiments, the agricultural applicator may be configured as any other suitable type of the agricultural applicator configured to perform an agricultural spraying or other product application operations, such as a tractor or other work vehicle configured to haul or tow an applicator implement.

In some embodiments, such as the one illustrated in FIG. 1, the agricultural sprayer 10 may include a chassis 12 configured to support or couple to a plurality components. For example, front and rear wheels 14, 16 may be coupled to the chassis 12. The wheels 14, 16 may be configured to support the agricultural sprayer 10 relative to a ground surface and move the agricultural sprayer 10 in a direction of travel (e.g., as indicated by arrow 18 in FIG. 1) across a field 20. In this regard, the agricultural sprayer 10 may include a power plant, such as an engine, a motor, or a hybrid engine-motor combination, and a transmission configured to transmit power from the engine to the wheels 14, 16.

The chassis 12 may also support a cab 22, or any other form of operator's station, that houses various control or input devices (e.g., levers, pedals, control panels, buttons, and/or the like) for permitting an operator to control the operation of the sprayer 10. For instance, as shown in FIG. 1, the agricultural sprayer 10 may include a user interface or human-machine interface (HMI) 24 for providing messages and/or alerts to the operator and/or for allowing the operator to interface with the vehicle's controller through one or more user-input devices 26 (e.g., levers, pedals, control panels, buttons, and/or the like) within the cab 22 and/or in any other practicable location.

The chassis 12 may also support one or more tanks, such as a product tank 28 and/or a rinse tank, and a boom assembly 30. The product tank 28 is generally configured to store or hold an agricultural product, such as a pesticide(s) (e.g., an herbicide(s), insecticide(s), rodenticide(s), etc.) and/or a nutrient(s). The agricultural product is conveyed from the product tank 28 through a product circuit including numerous plumbing components, such as interconnected pieces of tubing, for release onto the underlying field 20 (e.g., plants and/or soil) through one or more nozzle assemblies 32 mounted on the boom assembly 30 (or the sprayer 10).

In general, each nozzle assembly 32 is configured to dispense an agricultural product stored within an associated tank (e.g., product tank 28) onto the underlying field 20 and/or by a pump 72 (FIG. 4). In this regard, each nozzle assembly 32 may include a nozzle valve 102 (FIG. 4) and an associated spray tip or spray nozzle 104 (FIG. 4). In several embodiments, the operation of each nozzle valve 102 may be individually controlled such that the valve regulates the flow rate of the agricultural product through the associated nozzle assembly 32, and thus, the flow rate of the agricultural product dispensed from the respective spray nozzle 104. Such control of the operation of the nozzle valve 102 may also be used to achieve the desired spray characteristics for the output or spray fan expelled from the associated spray nozzle 104, such as a desired droplet size and/or spray pattern. For instance, the nozzle valve 102 may be configured to be pulsed between open/closed positions relative to an orifice of the adjacent spray nozzle 104 at a given frequency and duty cycle (e.g., using a pulse width modulation (PWM) technique) to achieve the desired flow rate and spray characteristics for the respective nozzle assembly 32.

As shown in FIGS. 1 and 2, the boom assembly 30 can include a frame 34 that supports first and second boom arms 36, 38, which may be orientated in a cantilevered nature. The first and second boom arms 36, 38 are generally movable between an operative or unfolded position (FIG. 1) and an inoperative or folded position (FIG. 2). When distributing the agricultural product, the first and/or second boom arm 36, 38 extends laterally outward from the agricultural sprayer 10 to the operative position in order to cover wide swaths of the underlying ground surface, as illustrated in FIG. 1. When extended, each boom arm 36, 38 defines a first lateral distance $d_1$ defined between the frame 34 and an outer nozzle assembly $32_o$ and/or an outer end portion of the boom arms 36, 38. Further, the boom arms 36, 38, when both unfolded, define a field swath 40 between the respective outer nozzle assemblies $32_o$ of the first and second boom arms 36, 38 that is generally commensurate with an area of the field 20 to which the agricultural sprayer 10 covers during a pass across a field 20 to perform the agricultural operation. However, it will be appreciated that in some embodiments, a single boom arm 36, 38 may be utilized during the application operation. In such instances, the field swath 40 may be an area defined between a pair of nozzle assemblies 32 that are furthest from one another in the lateral direction 60.

To facilitate transport, each boom arm 36, 38 of the boom assembly 30 may be independently folded forwardly or rearwardly into the inoperative position, thereby reducing the overall width of the sprayer 10, or in some examples, the overall width of a towable implement when the applicator is configured to be towed behind the agricultural sprayer 10.

Each boom arm 36, 38 of the boom assembly 30 may generally include one or more boom sections. For instance, in the illustrated embodiment, the first boom arm 36 includes three boom sections, namely a first inner boom section 42, a first middle boom section 46, and a first outer boom section 50, and the second boom arm 38 includes three boom sections, namely a second inner boom section 44, a second middle boom section 48, and a second outer boom section 52. In such an embodiment, the first and second inner boom sections 42, 44 may be pivotably coupled to the frame 34. Similarly, the first and second middle boom sections 46, 48 may be pivotably coupled to the respective first and second inner boom sections 42, 44, while the first and second outer boom sections 50, 52 may be pivotably coupled to the respective first and second middle boom sections 46, 48. For example, each of the inner boom sections 42, 44 may be pivotably coupled to the frame 34 at pivot joints 54. Similarly, the middle boom sections 36, 38 may be pivotally coupled to the respective inner boom sections 42, 44 at pivot joints 56, while the outer boom sections 50, 52 may be pivotably coupled to the respective middle boom sections 46, 48 at pivot joints 58.

As is generally understood, pivot joints 54, 56, 58 may be configured to allow relative pivotal motion between the adjacent boom sections of each boom arm 36, 38. For example, the pivot joints 54, 56, 58 may allow for articulation of the various boom sections between a fully extended or working position (e.g., as shown in FIG. 1), in which the boom sections are unfolded along a lateral direction 60 of the boom assembly 30 to allow for the performance of an agricultural spraying operation, and a transport position (FIG. 2), in which the boom sections are folded inwardly to reduce the overall width of the boom assembly 30 along the lateral direction 60. It should be appreciated that, although each boom arm 36, 38 is shown in FIG. 1 as including three individual boom sections coupled along opposed sides of the central boom section, each boom arm 36, 38 may generally have any suitable number of boom sections.

Additionally, as shown in FIG. 1, the boom assembly 30 may include inner fold actuators 62 coupled between the inner boom sections 42, 44 and the frame 34 to enable pivoting or folding between a plurality of angles in a fore-aft direction by an actuator coupled with the frame 34 and one of the one or more boom arms 36, 38. For instance, the plurality of angles can include a storage angle when one or both of the boom arms 36, 38 are positioned in a folded, inoperable position. One or both of the boom arms 36, 38 can also be rotated to a default angle relative to the frame 34 in which one or both of the boom arms 36, 38 extend a default direction from the frame 34 for operative use of the boom arms 36, 38.

For example, by retracting/extending the inner fold actuators 62, the inner boom sections 42, 44 may be pivoted or folded relative to the frame 34 about a pivot axis 54A defined by the pivot joints 54. Moreover, the boom assembly 30 may also include middle fold actuators 64 coupled between each inner boom section 42, 44 and its adjacent middle boom section 46, 48 and outer fold actuators 66 coupled between each middle boom section 46, 48 and its adjacent outer boom section 50, 52. As such, by retracting/extending the middle and outer fold actuators 64, 66, each middle and outer boom section 46, 48, 50, 52 may be pivoted or folded relative to its respective inwardly adjacent boom section 42, 44, 46, 48 about a respective pivot axis 56A, 58A. When moving to the transport position, the boom assembly 30 and fold actuators 62, 64, 66 are typically oriented such that the pivot axes 54A, 56A, 58A are generally parallel to the vertical direction and, thus, the various boom sections 42, 44, 46, 48, 50, 52 of the boom assembly 30 are configured to be folded horizontally (e.g., parallel to the lateral direction 60) about the pivot axes 54A, 56A, 58A to keep the folding height of the boom assembly 30 as low as possible for transport. However, the pivot axes 54A, 56A, 58A may be oriented along any other suitable direction.

Referring to FIG. 3, prior to performing an agricultural operation with the boom assembly 30, each boom arm 36, 38 may be configured to extend a first lateral distance $d_1$ away from the sprayer 10 and/or the frame 34 along a default axis $a_d$. It will be appreciated that although boom arm 36 is generally illustrated in FIG. 3, any boom arm 36, 38 of the boom assembly 30 may operate in a similar manner without departing from the scope of the present disclosure.

In various embodiments, the default axis $a_d$ may generally be offset ninety degrees relative to the vehicle travel direction such that the default axis $a_d$ is generally aligned with the lateral direction 60. The first lateral distance $d_1$ can be defined as a distance between the frame 34 and an outer nozzle assembly $32_o$ and/or an outer end portion of each boom arm 36, 38. Moreover, when the first and second boom arms 36, 38 are extended from opposing sides of the frame 34, the boom arms 36, 38 can define a field swath 40 (one side of the field swath is illustrated in FIG. 3) between the outer nozzle assemblies $32_o$ of the first and second boom arms 36, 38, or between the outer end portions of the first and second boom arms 36, 38 depending on the agricultural operation and/or specific spray operation. Further, in some operations, a single boom arm 36, 38 may be used. In such instances, the field swath 40 may be defined between an outer and an inner operating nozzle assembly $32_i$, $32_o$.

During operation, various forces may be placed on the boom assembly 30 causing the boom arms 36, 38 and, consequently, the nozzle assemblies 32 positioned along the boom arms 36, 38, to be deflected or repositioned relative to the frame 34 and/or sprayer 10. For instance, a portion of the boom assembly 30 may be deflected from an assumed or a default position $d_p$ due to high dynamic forces encountered when the sprayer 10 is turned, accelerated, or decelerated. In addition, terrain variations and weather variances may also cause deflection of the boom assembly 30. Further, a portion of the boom assembly 30 may come in contact with an object, thereby leading to deflection of the boom assembly 30.

Once the boom arm 36 is deflected in a fore direction $d_f$ (i.e., a direction of forward movement of the sprayer 10 as indicated by arrow 18 in FIG. 1) and/or in an aft direction $d_a$ (i.e., an opposing direction of the forward movement of the sprayer 10 as indicated by arrow 18 in FIG. 1) of its default position $d_p$, as generally illustrated in FIG. 3, the outer nozzle assembly $32_o$ may be positioned a second lateral distance $d_2$ from the frame 34, which may be less than the first lateral distance $d_1$ due to a curvature of the boom assembly 30. Accordingly, a lateral variance v is formed between the first and second lateral distances $d_1$, $d_2$. This lateral variance v may lead to a misapplication of an agricultural substance to the underlying field 20, which may be in the form of an overapplication or an underapplication of the agricultural product. For instance, in the area of the underlying field 20 between the frame 34 and the outer nozzle assembly $32_o$ may have an overapplication of the agricultural product applied thereto when the boom arm 36 is deflected, while the portion of the underlying field 20 below the variance v may have an underapplication of the agricultural product applied thereto. In addition to creating a variance v, the deflection of the boom arm 36 also creates an offset between the outer nozzle assembly $32_o$ in the default position $d_p$ and the deflected positions $d_f$, $d_a$, which may also lead to inaccuracies during application of the agricultural product to the underlying field 20.

In embodiments, such as the one illustrated in FIG. 3, that utilize a boom arm 36 that is supported by the frame 34 in a cantilevered orientation (or any other non-uniform orientation), an outer nozzle assembly $32_o$ will have a greater deflection magnitude from its default position $d_p$ than an inner nozzle assembly 31. Once the deflective force is overcome and/or no longer present, the boom arm 36 will move back towards its default position $d_p$. In some embodiments, the movement of the boom arm 36 may generally occur as harmonic oscillations across the default axis $a_d$ such that the boom arm 36 may move from a position at least partially aft of the default axis $a_d$ to the default position $d_p$ and then to a position at least partially fore of the default position $d_p$ and so on. During the oscillations, an acceleration of an inner nozzle assembly $32_i$ will be less than the outer nozzle assembly $32_o$ due to the varied deflection magnitudes along the boom arm 36.

In some embodiments, a boom speed or boom acceleration of each nozzle assembly 32 along the boom arm 36 may be calculated based on the detected and/or calculated position of various portions of the boom arm 36 at known time periods. The boom speed or boom acceleration may be a speed or acceleration of the boom arm 36 proximate to defined positions of each nozzle assembly 32 relative to the frame 34. In some examples, the frame 34 may be affixed to the sprayer 10 and/or the frame 34 of the sprayer 10 such that the frame 34 moves at a common chassis speed as the sprayer 10. Based on the summation of the boom speed, or boom acceleration, with the chassis speed, a nozzle speed/acceleration relative to the field 20 may be calculated. In various embodiments, when a product pump 72 is operated at a known flow rate and the nozzle speed is calculated, an application rate (e.g., gallons per acre (GPA)) of agricultural product may be calculated for each nozzle assembly 32 along the boom arm 36. In some instances, a desired application rate of agricultural product may be defined. When applying agricultural product to an underlying field 20, if the calculated application rate (e.g., GPA) of agricultural product deviates from the desired application rate of agricultural product by more than a predefined percentage, a notification may be provided and/or areas of a field 20 in which the deviation occurs may be illustrated on one or more displays, as will be described in greater detail below.

With further reference to FIG. 3, a sensor 68 can be configured to output data indicative of a measured boom position, a measured boom height, a measured pitch angle, a measured yaw angle, a measured pressure, a measured velocity, a measured acceleration/deceleration, and/or a measured roll angle of the sprayer 10 and/or the boom assembly 30. The boom position information detected by the sensor 68 may enable the sprayer 10 to calculate a curvature of the boom assembly and determine boom arm movement of the one or more boom arms 36, 38 of the boom assembly 30 based on the curvature. The boom arm movement may be any metric of measurement that determines that at least a portion of the boom arm 36 has deviated from the default position $d_p$, which may be detected by determining that the boom arm 36 has moved from the default axis $a_d$ by a deflection magnitude at any point along the boom arm 36 or that a portion of the boom arm 36 is experiencing an acceleration/deceleration that is varied from that of the frame 34 and/or the sprayer 10.

In some examples, a first sensor 68 may be positioned on one of the boom arms 36, 38 at a position proximate to the frame 34 and a second sensor 68 may be positioned on proximate the outer portion of the boom assembly 30. Based on the relationship of the first sensor 68 to the second sensor 68, an estimated curvature of the boom assembly 30 may be calculated. In other examples, a single sensor 68, which may be mounted on the boom arms 36, 38, may be used to calculate an estimated curvature of the boom assembly 30. In still yet other examples, the sensor 68 may be positioned on the frame 34 and/or the sprayer 10 and monitor the boom assembly 30 remotely such that the boom assembly 30 is free of sensors 68 and the estimated curvature of the boom assembly 30 is calculated by the remote sensor 68.

Referring to FIG. 4, a system 70 is illustrated in accordance with various aspects of the present subject matter. In general, the sprayer system 70 will be described herein in relation to the agricultural sprayer 10 described above with reference to FIGS. 1-3. However, it should be appreciated that the sprayer system 70 may be advantageously utilized to control the application of the agricultural product in association with any other suitable agricultural applicator, including sprayers having any other suitable sprayer configuration.

In several embodiments, the sprayer system 70 may include various boom-related components of an associated agricultural applicator, such as one or more of the components of the boom assembly 30 described above. For instance, as shown in FIG. 1, the sprayer system 70 can include the boom assembly 30, which includes the frame 34 and one or more boom arms 36, 38 extending from the frame 34. The boom assembly 30 is further configured to support one or more nozzle assemblies 32 spaced there along. In general, each nozzle assembly 32 is configured to dispense an agricultural product stored within an associated tank (e.g., product tank 28) onto the underlying field 20 and/or plants by a pump 72. In this regard, each nozzle assembly 32 may include a nozzle valve and an associated spray tip or spray nozzle. In several embodiments, the operation of each nozzle valve may be individually controlled such that the valve regulates the flow rate of the agricultural product through the associated nozzle assembly 32, and thus, the application rate of the agricultural product dispensed from the respective spray nozzle. Such control of the operation of the nozzle valve may also be used to achieve the desired spray characteristics for the output or spray fan expelled from the associated spray nozzle, such as a desired droplet size and/or spray pattern. For instance, the nozzle valve may be configured to be pulsed between open/closed positions relative to an orifice of the adjacent spray nozzle at a given frequency and duty cycle (e.g., using a pulse width modulation (PWM) technique) to achieve the desired flow rate and spray characteristics for the respective nozzle assembly 32.

Referring to FIG. 4, a sprayer system 70 is illustrated in accordance with various aspects of the present subject matter. In general, the sprayer system 70 will be described herein in relation to the agricultural sprayer 10 described above with reference to FIGS. 1-3. However, it should be appreciated that the sprayer system 70 may be advantageously utilized to control the application of the agricultural product in association with any other suitable agricultural applicator, including sprayers having any other suitable sprayer configuration.

In several embodiments, the sprayer system 70 includes a computing system 74 that receives the data of the sensor 68 and controls the one or more nozzle assemblies 32 based on the received data. For example, in some embodiments, the computing system 74 can be configured to determine whether one or more boom arms 36, 38 are experiencing boom arm movement based on the data and vary a flow rate of agricultural product from each of the nozzle assemblies 32 based on the boom arm movement.

In general, the computing system 74 may comprise one or more processor-based devices, such as a given controller or computing device or any suitable combination of controllers or computing devices. Thus, in several embodiments, the computing system 74 may include one or more processor(s) 76, and associated memory device(s) 78 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 78 of the computing system 74 may generally comprise memory element(s) including, but not limited to, a computer-readable medium (e.g., random access memory RAM)), a computer-readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 148 may generally be configured to store suitable computer-readable instructions that, when implemented by the processor(s) 76, configure the computing system 74 to perform various computer-implemented functions, such as one or more aspects of the methods and algorithms that will be described herein. In addition, the computing system 74 may also include various other suitable components, such as a communications circuit or module, one or more input/output channels, a data/control bus and/or the like.

It should be appreciated that the various functions of the computing system 74 may be performed by a single processor-based device or may be distributed across any number of processor-based devices, in which instance such devices may be considered to form part of the computing system 74. For instance, the functions of the computing system 74 may be distributed across multiple application-specific controllers, such as a pump controller, individual nozzle controllers, and/or the like.

Referring still to FIG. 4, the sensor 68 may be configured as any type of sensor that is capable of providing data that can be used to determine boom arm movement by the computing system 74. For instance, the sensor 68 may be configured as a pressure sensor that is operably coupled with an actuator 62, 64, 66 of the boom assembly 30 and/or positioned between two portions of the boom assembly 30 that are hingedly coupled to one another at one of the joints (e.g., 54, 56, 58) of the boom assembly 30. In instances in which the pressure sensor is operably coupled with an actuator 62, 64, 66 of the boom assembly 30, the pressure sensor may monitor pressure changes during the agricultural operation. Based on the variations in pressure within the actuator 62, 64, 66, the computing system 74 can determine whether boom arm movement has occurred, if the boom arm movement has deviated from a predefined range, a nozzle speed at one or more nozzle assemblies 32, and/or an application rate based on the nozzle speed and a flow rate of the agricultural product.

In some embodiments, the sensor 68 may be configured as a strain gauge that detects strain indicative of the deflection of at least one of the boom arms 36, 38 at a joint 54, 56, 58 of the boom assembly 30. In various embodiments, the sensor 68 may be a capacitive displacement sensor, Hall effect sensor, string potentiometers, or the like. Based on the detected strain, the computing system 74 can determine whether boom arm movement has occurred, if the boom arm movement has deviated from a predefined range, a nozzle speed at one or more nozzle assemblies 32, and/or an application rate based on the nozzle speed and a flow rate of the agricultural product.

Additionally, and/or alternatively, in some examples, the sensor 68 may be configured as an inertial measurement unit (IMU) that measures a specific force, angular rate, and/or an orientation of at least one of the boom arms 36, 38 using a combination of accelerometers, gyroscopes, magnetometers, and/or any other practicable device. The accelerometer may correspond to one or more multi-axis accelerometers (e.g., one or more two-axis or three-axis accelerometers) such that the accelerometer may be configured to monitor the acceleration of the sprayer 10 and/or the boom assembly 30 in multiple directions, such as by sensing the sprayer 10 acceleration along three different axes. It will be appreciated, however, that the accelerometer may generally correspond to any suitable type of accelerometer without departing from the teachings provided herein. When the accelerometer provides data that the boom arm 36, 38 has moved from its default axis $a_d$, the computing system 74 can determine whether boom arm movement has occurred, if the boom arm movement has deviated from a predefined range, a nozzle speed at one or more nozzle assemblies 32, and/or an application rate based on the nozzle speed and a flow rate of the agricultural product.

With further reference to FIG. 4, in accordance with aspects of the present subject matter, the sensor 68 may additionally or alternatively correspond to an image sensor (an area-type image sensor, such as a CCD or a CMOS image sensor, and image-capturing optics that capture an image of an imaging field of view). In various embodiments, the image sensor may correspond to a stereographic camera having two or more lenses with a separate image sensor for each lens to allow the camera to capture stereographic or three-dimensional images. However, in alternative embodiments, the image sensor may correspond to any other suitable sensing devices configured to capture image or image-like data, such as a monocular camera, a LIDAR sensor, and/or a RADAR sensor.

In embodiments incorporating an image sensor, each image sensor may be coupled to or mounted on the boom assembly 30 and configured to detect image data relating to a location of an object separated from the boom arm 36, 38 at two instances with a defined time period between the two instances. As such, the computing system 74 can calculate an acceleration, orientation, and movement direction of the boom arm 36, 38 based on the image data, any of which may be used by the computing system 74 for determining whether boom arm movement has occurred, if the boom arm movement has deviated from a predefined range, a nozzle speed at one or more nozzle assemblies 32, and/or an application rate based on the nozzle speed and a flow rate of the agricultural product.

Additionally, and/or alternatively, in some embodiments, one or more image sensor may be separated from the boom arm 36, 38 with at least a portion of the boom arm 36, 38 within a field of view of the image sensor. For example, the image sensor may be positioned on the frame 34 of the boom assembly 30 and/or on the sprayer 10. In such instances, the image sensor may be capable of detecting the position of the boom arm 36, 38. In some examples, the image sensor may detect a position of the boom arm 36, 38 at two separate instances with a defined time period between the two instances. Accordingly, the image sensor may be capable of detecting a position and a movement of the boom assembly 30. Based on this information, the computing system 74 can determine whether boom arm movement has occurred, if the boom arm movement has deviated from a predefined range, a nozzle speed at one or more nozzle assemblies 32, and/or an application rate based on the nozzle speed and a flow rate of the agricultural product.

In some embodiments, the sensor 68 may additionally or alternatively correspond to one or more fluid conduit pressure sensors. In general, the pressure sensor may be configured to capture data indicative of the pressure of the agricultural product being supplied to the nozzle assemblies 32. As such, the pressure sensor may be provided in fluid communication with one of the fluid conduits that fluidly couple the product tank 28 to the nozzle assemblies 32. For example, the pressure sensor may correspond to a diaphragm pressure sensor, a piston pressure sensor, a strain gauge-based pressure sensor, an electromagnetic pressure sensor, and/or the like. In operation, as one or both of the boom arms 36, 38 deflect, pressure variances v may be caused along the fluid conduit. Accordingly, by measuring the pressure variances through the sensor 68, the computing system 74 can determine whether boom arm movement has occurred, if the boom arm movement has deviated from a predefined range, a nozzle speed at one or more nozzle assemblies 32, and/or an application rate based on the nozzle speed and a flow rate of the agricultural product.

In various embodiments, the sensor 68 may additionally or alternatively correspond to one or more airspeed sensors. In general, the airspeed sensor may be configured to capture data indicative of the airspeed of the air flowing past the boom assembly 30. The airspeed data may, in turn, be indicative of the speed at which the air moves relative to the boom assembly 30. In this respect, airspeed data may consider both the airflow caused by the boom arm movement relative to the ground and the airflow caused by any wind that is present. For example, the airspeed sensor may correspond to a pitot tube, an anemometer, and/or the like. By measuring the boom arm movement relative to the ground through the sensor 68, the computing system 74 can determine whether boom arm movement has occurred, if the boom arm movement has deviated from a predefined range, a nozzle speed at one or more nozzle assemblies 32, and/or an application rate based on the nozzle speed and a flow rate of the agricultural product.

With further reference to FIG. 4, in addition to receiving the data of the sensor 68, the computing system 74 may also be configured to control the operation of each nozzle assembly 32. Specifically, in several embodiments, the computing system 74 may be communicatively coupled to a nozzle valve 102 of each of the nozzle assemblies 32 to allow the operation of such nozzle valve 102 to be automatically or electronically controlled. For instance, the computing system 74 may be configured to control the operation of each nozzle valve 102 to regulate the flow rate of the agricultural product through the associated spray nozzle 104, such as by transmitting suitable PWM control signals to each nozzle valve 102 to cause such valve 102 to be pulsed at a given frequency and duty cycle to achieve the desired flow rate. In some embodiments, such individual nozzle control may be based on sensor feedback received by the computing system 74. For example, suitable flow rate sensors may be provided in operative association with one or more of the nozzle assemblies 32 (including all of the nozzle assemblies 32) to allow the computing system 74 to monitor the flow rates through the nozzle assemblies 32 and control the respective nozzle valves 102 accordingly.

In some embodiments, the computing system 74 may receive the data from the sensor 68 and regulate an outer nozzle assembly $32_o$ at a first flow rate if the computing system 74 determines that boom arm movement does not exist and/or the boom arm movement is within a predefined range. Further, the computing system 74 may regulate the outer nozzle assembly $32_o$ at a second flow rate when the boom arm movement deviates from the predefined range. In addition, a second nozzle assembly $32_i$ may be positioned inboard of the outer nozzle assembly $32_o$ and the outer and inner nozzle assemblies $32_o$, $32_i$ can be regulated at a common flow rate when the calculated boom arm movement is within the predefined range and at differing flow rates when the boom arm movement deviates from the predefined range. In various embodiments, the independent regulation of the nozzle assemblies $32_o$, $32_i$ can allow for a more consistent application rate of agricultural product along the width of the boom assembly 32. As used herein, inboard and outboard define a position relationship of a pair of components relative to one another. For example, when two components are spaced from one another along the boom arm 36, 38, the "inboard" component is the component that is positioned between the other component and the frame 34. Likewise, the "outboard" component is the one that is positioned between the other component and the outer end portion of the boom arm 36, 38.

In addition to regulating the flow rate of the one or more nozzle assemblies 32, the computing system 74 may also provide notification instructions to the HMI 24, a vehicle notification system 80, and/or a remote electronic device 82 if the boom arm movement exceeds the predefined range and/or if the calculated variance v deviates from a predefined range as such an occurrence may cause an inadequate application rate to a portion of the field 20.

In some examples, the HMI 24 may include a display 84 having a touchscreen 86 mounted within a cockpit module, an instrument cluster, and/or any other location of the sprayer 10. The display 84 may be capable of displaying information related to the boom assembly 30 or any other information. In some embodiments, the HMI 24 may include a user-input device 26 in the form of circuitry 88 within the touchscreen 86 to receive an input corresponding with a location over the display 84. Other forms of input, including one or more joysticks, digital input pads, or the like can be used in place or in addition to the touchscreen 86. In some instances, a desired application rate, a predefined range for boom arm movement, and/or a predefined threshold for the calculated variance v may be set, either as an initial/default range or as an operator defined value or range through the touchscreen 86 and/or any other user-input device 26. The predefined range may be agricultural product specific.

In some embodiments, the vehicle notification system 80 may prompt visual, auditory, and tactile notifications and/or warnings when the deflection magnitude exceeds a predefined range, a calculated nozzle speed exceeds a predefined range, an application rate deviates from a calculated application range by a predefined amount, and/or if the calculated variance v deviates from a predefined range. For instance, vehicle lights 90 and/or vehicle emergency flashers may provide a visual alert. A vehicle horn 92 and/or a speaker 94 may provide an audible alert. A haptic device 96 integrated into a steering wheel, a seat, an armrest, and/or any other location may provide a tactile alert.

The sprayer system 70 may also communicate via wired and/or wireless communication with the remote electronic devices 82 through a transceiver 98. The network may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The electronic device 82 may also include a display for providing information to a user. For instance, the electronic device 82 may display one or more graphical user interfaces and may be capable of receiving remote user-inputs to set a predefined range for boom arm movement, a predefined threshold for the variance v, and/or to input any other information, such as the agricultural product to be used in an application operation. In addition, the electronic device 82 may provide feedback information, such as visual, audible, and tactile alerts. It will be appreciated that the electronic device 82 may be any one of a variety of computing devices and may include a processor and memory. For example, the electronic device 82 may be a cell phone, mobile communication device, key fob, wearable device (e.g., fitness band, watch, glasses, jewelry, wallet), apparel (e.g., a tee shirt, gloves, shoes or other accessories), personal digital assistant, headphones and/or other devices that include capabilities for wireless communications and/or any wired communications protocols.

With further reference to FIG. 4, in several embodiments, a location device 100 may be configured to determine the location of the agricultural sprayer 10 and/or the boom assembly 30 by using a satellite navigation location device 100 (e.g. a GPS system 70, a Galileo location device, the Global Navigation satellite system (GLONASS), the BeiDou Satellite Navigation and Location device, a dead reckoning device, and/or the like). In such embodiments, the location determined by the location device 100 may be transmitted to the computing system 74 (e.g., in the form of location coordinates) and stored within the computing system 74 for subsequent processing and/or analysis. Based on the location data, the computing system 74 may additionally store the location of the sprayer 10 at the time of the notification. The stored location may be displayed through an associated geo-located field map to illustrate locations of the field 20 in which an agricultural product may have been misapplied. In addition, the geo-located field map may further illustrate a detected position, a corrected position, and/or a projected position of the boom assembly 30 with no active mitigation thereof.

In some embodiments, the sprayer system 70 may also provide the operator with various mitigation techniques when the deflection magnitude exceeds a predefined range, a calculated nozzle speed exceeds a predefined range, an application rate deviates from a calculated application range by a predefined amount, and/or if the calculated variance v deviates from a predefined range. For example, when boom arm movement exceeds the predefined threshold thereby causing an application rate to deviate from a predefined range, the computing system 74 may provide the user with actions that may mitigate the boom arm movement, such as providing other damping measures or slowing the sprayer 10. It will be appreciated that notifications provided by the computing system 74 may include any other information relating to any other component of the sprayer 10 and/or the boom assembly 30 and mitigation instructions for mitigating any issue that may occur in relation to any component of the sprayer 10. Additionally, and/or alternatively, the computing system 74 may actively control various operations of the sprayer 10, such as by making a one-time adjustment to one or more operating parameters associated with the operation of the sprayer 10 and/or the boom assembly 30 based on the data generated by the sensor 68.

Referring now to FIG. 5, when the boom arm 38 is deflected from a default position $d_p$, the computing system 74 may be configured to detect the boom arm movement. In various embodiments, the boom arm movement can be any metric of measurement that determines that at least a portion of the boom arm 38 has deviated from the default position $d_p$, which may be detected by determining that the boom arm 38 has moved from the default axis $a_d$ by a deflection magnitude at any point along the boom arm 38. Additionally, or alternatively, the boom arm movement can be a measure of a boom arm acceleration/deceleration differential between the frame 34 and the boom arm 38, wherein the differential is generally equal to zero when the boom arm 38 is in the default position $d_p$ and the boom arm acceleration/deceleration of the at least one of the outer or inner nozzle assembly $32_o$, $32_i$ is not equal to zero when the boom arm 38 is in a deflected position. In some instances, based on the boom arm movement, the computing system 74 may be configured to select any of the flow rates for the various nozzle assemblies 32 from a lookup table based on a calculated acceleration/deceleration of the boom arm 38. It will be appreciated that although boom arm 38 is generally illustrated in FIG. 5, any boom arm 36, 38 of the boom assembly 30 may operate in a similar manner without departing from the scope of the present disclosure.

In embodiments, such as the one illustrated in FIG. 5, that utilize a boom arm 38 that is supported by the frame 34 in a cantilevered orientation (or any other non-uniform orientation), an outer nozzle assembly $32_o$ will have a greater deflection magnitude from its default position $d_p$ than an intermediate nozzle assembly $32_m$, which will have a greater deflection from its default position $d_p$ than an inner nozzle assembly $32_i$. Once the deflective force is overcome and/or no longer present, the boom arm 38 will move back towards its default position $d_p$. In some embodiments, the movement of the boom arm 38 may generally occur as harmonic oscillations across the default axis $a_d$ such that the boom arm 38 may move from a position at least partially aft of the default axis $a_d$ to the default position $d_p$ and then to a position at least partially fore of the default position $d_p$ and so on. During the oscillations, an acceleration of an inner nozzle assembly $32_i$ will be less than an intermediate nozzle assembly $32_m$, which in turn, will be less than an acceleration of the outer nozzle assembly $32_o$ due to the varied deflection magnitudes along the boom arm 38.

As each nozzle assembly $32_i$, $32_m$, $32_o$ moves at a varied acceleration relative to one another based on the deflection of the boom arm 38, in some embodiments, the computing system 74 may alter the flow rates of each nozzle assembly $3_i$, $32_m$, $32_o$ relative to one another $3_i$, $32_m$, $32_o$, or sections of nozzle assemblies 32, along the boom arm 38 to mitigate misapplication of the agricultural product. As indicated above, the computing system 74 may be configured to control the nozzle valves 102 to achieve the desired flow rate (e.g., by varying the duty cycle at which the valve 102 is pulsed), thereby allowing the nozzle assemblies 32 to produce the desired spray characteristics (e.g., the desired droplet size and/or spray pattern) and/or increase/decrease the flow rate based on the deflection magnitude and/or acceleration of the boom arm 38. In this regard, in instances in which the boom arm 38 is deflected, the flow rate of each nozzle assemblies 32 may be varied from one another to compensate for the varying deflection magnitude and/or acceleration/deceleration of the nozzle assemblies 32 along the boom arm 38 to assist in maintaining a desired application rate of agricultural product and the desired spray characteristics.

In some embodiments, the computing system 74 may be configured to regulate the outer and inner nozzle assemblies $32_o$, $32_i$ at a common flow rate when the boom arm movement is within a predefined range and at differing flow rates when the movement exceeds the predefined range. For example, when the boom arm movement deviates from the predefined range, the outer nozzle assembly $32_o$ is regulated at a first flow rate and the inner nozzle assembly $32_i$ is regulated at a second flow rate, with the second flow rate being regulated independently of the first flow rate. For instance, the second flow rate may be greater and/or lower than the first flow rate when the inner nozzle assembly $32_i$ is outboard of the first sensor 68.

Once the boom arm movement remains within the predefined range for a defined period of time or once the boom arm 38 has crossed the default axis $a_d$ in both the fore and the aft directions and remained within the predefined range, the computing system 74 may determine that the boom arm 38 has generally returned to its default position $d_p$. Upon returning the default position $d_p$, each of the nozzle assemblies 32 may return to a generally common flow rate.

In some embodiments, the computing system 74 is further configured to calculate boom arm movement of the boom arm 38 at each of an outer and an inner nozzle assembly $32_o$, $32_i$, positioned along the boom arm 38. Based on the boom arm movement of the boom arm 38 at each nozzle assembly 32, a nozzle movement ratio can be calculated. Based on the nozzle movement ratio, a lookup table may be referenced to determine first and second flow rates. As provided herein, the nozzle assemblies 32 will experience varied boom arm movement, and therefore, by adjusting the flow rates of the outer and inner nozzle assemblies $32_o$, $32_i$ based on the ratio therebetween, a more common application rate of agricultural product may be applied to the field 20. When adjusting the flow rates of the outer and inner nozzle assemblies $32_o$, $32_i$ based on the nozzle movement ratio, a flow rate of the outer nozzle assembly $32_o$ may be altered while a flow rate of the inner nozzle assembly $32_i$ may stay generally constant, a flow rate of the outer nozzle assembly $32_o$ may be generally constant while a flow rate of inner nozzle assembly $32_i$ may be altered, and/or a flow rate of both the outer and inner nozzle assemblies $32_o$, $32_i$ may both be altered.

In various embodiments, the computing system 74 is further configured to store previous boom arm movement data and predict the deceleration/acceleration of the boom arm 38 based on previous data. For example, the computing system 74, through usage of the location device 100, may be capable of predicting an upcoming turn and/or a variance in terrain both of which may cause boom arm movement. Based on the previous data, the flow rate of a nozzle assembly 32 along the boom arm 38 may be adjusted. Accordingly, the system may preemptively adjust one or more nozzle assemblies 32 such that a flow rate is altered prior to an oncoming maximum deflection magnitude and/or a maximum acceleration being sensed by the sensor 68.

Referring now to FIG. 6, a flow diagram of some embodiments of a method 200 for monitoring a spray quality during an application operation is illustrated in accordance with aspects of the present subject matter. In general, the method 200 will be described herein with reference to the sprayer 10, the boom assembly 30, and the sprayer system 70 described above with reference to FIGS. 1-5. However, it should be appreciated by those of ordinary skill in the art that the disclosed method 200 may generally be utilized to monitor one or more application variables of any suitable applicator associated with any suitable agricultural sprayer 10 and/or may be utilized in connection with a system having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, the method provided herein may implement closed loop (and/or open loop) strategies. For example, at step (202), the method 200 may begin by controlling an operation of a product pump 72 to supply agricultural product through the outer and inner nozzle assemblies $32_o$, $32_i$. For instance, as indicated above, a computing system 74 may be configured to automatically or electronically control the operation of the product pump 72 to supply agricultural product from a product tank 28 to each of the nozzle assemblies 32 such that each of the nozzle assemblies 32 may dispense or otherwise spray a fan of the agricultural product onto the underlying field 20.

Additionally, at (204), the method can include controlling an operation of a nozzle valve 102 of the outer nozzle assembly $32_o$ to regulate a first flow rate of the agricultural product through the outer nozzle assembly $32_o$. Likewise, at step (206), the method also includes controlling an operation of a nozzle valve 102 of the inner nozzle assembly $32_i$ to regulate a second flow rate of the agricultural product through the inner nozzle assembly $32_i$. For instance, as indicated above, the computing system 74 may be configured to automatically or electronically control the operation of each nozzle valve 102 to achieve a desired flow rate through each associated nozzle assembly 32, such as by pulsing each nozzle valve 102 at a given frequency and duty cycle to achieve the desired flow rate. It will be appreciated that any of the steps provided herein may occur in any order and/or simultaneously.

Moreover, at (208), the method can include receiving data indicative of a movement of the boom assembly 30 in the fore-aft direction from the sensor 68. As indicated above, the sensor 68 may be configured to provide data related to a position of the boom assembly 30. Based on the data, the computing system 74 can be configured to determine whether boom arm movement has occurred, if the boom arm movement has deviated from a predefined range, a nozzle speed at one or more nozzle assemblies 32, and/or an application rate based on the nozzle speed and a flow rate of the agricultural product. As provided herein, boom arm movement can be any metric of measurement that determines that at least a portion of the boom arm 36, 38 has deviated from the default position $d_p$, which may be detected by determining that the boom arm 36, 38 has moved from the default axis $a_d$ by a deflection magnitude at any point along the boom arm 36, 38.

Next, at (210), the method may determine if the calculated boom arm movement of the boom arm 36, 38 deviates from a predefined range. The predefined range may be provided as a defined deflection magnitude at a known position along the boom arm 36, 38, a range of angles relative to the default angle, and/or any other practicable metric. As indicated above, the predefined range may be a default range, a user-inputted range, and/or a product specific range. If the boom arm movement is less than the predefined range, the method returns to step (202). If the boom arm movement deviates from the predefined range, at (212), the method can include altering at least one of the first and second flow rates of the agricultural product. Moreover, in some examples, the inner nozzle assembly $32_i$ can be positioned inboard of the outer nozzle assembly $32_o$ and the first flow rate can be greater than the second flow rate when the boom arm movement deviates from the predefined range due to the greater boom arm movement at the outer nozzle assembly $32_o$. As provided herein, in various embodiments, the independent regulation of the nozzle assemblies $32_o$, $32_i$ can allow for a more consistent application rate of agricultural product along the width of the boom assembly 32.

In some instances, the method may include storing previous boom arm movement data and predicting the deceleration/acceleration of the boom arm 36, 38 based on previous data so that altering at least one of the first and second flow rates of the agricultural product may occur preemptively or before a maximum boom arm movement or boom acceleration occurs.

It is to be understood that the steps of the method 200 are performed by the controller upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the controller described herein, such as the method 200, is implemented in software code or instructions which are tangibly stored on a tangible computer-readable medium. The controller loads the software code or instructions via a direct interface with the computer-readable medium or via a wired and/or wireless network. Upon loading and executing such software code or instructions by the controller, the controller may perform any of the functionality of the controller described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

A variety of advantages may be derived from the use of the present disclosure. For example, use of the system and method provided herein can lead to advantages that include, but are not limited to cost, strength, durability, life cycle cost, marketability, appearance, packaging, size, serviceability, weight, manufacturability, ease of assembly, etc. In addition, by regulating various nozzle assemblies differently, the system provided herein may provide better coverage of a field by an agricultural product. Such systems may be even more beneficial when the nozzle assemblies are configured to intermittently apply agricultural products to distinct portions or plants within the underlying field.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An agricultural sprayer system comprising:
    a boom assembly having a frame and a boom arm operably coupled with the frame at one end portion thereof;
    outer and inner nozzle assemblies each supported by the boom arm, wherein the inner nozzle assembly is inboard of the outer nozzle assembly;
    a sensor operably coupled with the boom assembly and configured to capture data associated with the boom arm; and
    a computing system communicatively coupled to the sensor, the computing system being configured to calculate a boom arm movement from a default axis based on the data from the sensor and regulate the outer and inner nozzle assemblies at differing flow rates when the movement exceeds a predefined range.

2. The system of claim 1, wherein the sensor comprises at least one of an accelerometer, a pressure sensor, a LIDAR sensor, a RADAR sensor, or an ultrasonic sensor.

3. The system of claim 1, wherein the boom arm movement is a metric of measurement that determines that at least a portion of the boom arm has deviated from a default position by a deflection magnitude at any point along the boom arm.

4. The system of claim 1, further comprising:
    a location device communicatively coupled to the computing system, the computing system being configured to receive location coordinates from the location device associated with the boom assembly and correlate the location coordinates to the boom assembly to generate or update a geo-located map.

5. The system of claim 1, wherein the outer nozzle assembly is regulated at a first flow rate and the inner nozzle assembly is regulated at a second flow rate, and wherein the first flow rate is regulated independently of the second flow rate.

6. The system of claim 1, wherein the sensor is configured as an image sensor, and wherein the image sensor is configured to detect a location of an object separated from the boom arm at two instances with a defined time period between the two instances and the computing system determines the boom arm movement based on the two instances.

7. The system of claim 1, wherein the boom arm movement is a measure of a boom arm acceleration/deceleration differential between the frame and the boom arm, wherein the differential is generally equal to zero when the boom arm is in a default position and the boom arm acceleration/deceleration of the at least one of the outer or inner nozzle assembly is not equal to zero when the boom arm is in a deflected position.

8. The system of claim 1, wherein the computing system is further configured to determine a relative fore-aft boom arm movement at the outer nozzle assembly compared to the relative fore-aft boom arm movement at the inner nozzle assembly and uses a lookup table to determine first and second flow rates based on a nozzle movement ratio.

9. The system of claim 1, wherein the computing system is further configured to store previous boom arm movement data and predict the movement of the boom arm based on previous data, and wherein the flow rate of at least one of the outer nozzle assembly or the inner nozzle assembly is adjusted based on the previous data.

10. An agricultural sprayer system comprising:
    a boom assembly having a frame and a boom arm operably coupled with the frame;
    a nozzle assembly supported by the boom arm; and a computing system configured to calculate an acceleration/deceleration of the boom arm and regulate the nozzle assembly at a first flow rate when the acceleration/deceleration of the boom arm is within a predefined range and a second flow rate when the acceleration/deceleration of the boom arm deviates from the predefined range, wherein the second flow rate is received from a lookup table based on the calculated acceleration/deceleration of the boom arm.

11. The agricultural sprayer of claim 10, wherein the computing system is further configured to alter the nozzle assembly from the second flow rate back to the first flow rate once the boom arm crosses a default axis in both a fore direction and an aft directions while remaining within the predefined range.

12. The agricultural sprayer of claim 10, wherein the computing system is further configured to provide a mitigation instruction when the acceleration/deceleration of the boom arm deviates from the predefined range.

13. The agricultural sprayer of claim 10, wherein the computing system is further configured to store previous boom arm movement data and predict oncoming movement of the boom arm based on the previous data, and wherein the flow rate of the nozzle assembly is adjusted based on the previous data.

14. A method for operating an agricultural applicator, the agricultural applicator comprising a boom arm including at least outer and inner nozzle assemblies separated along the boom arm, the method comprising:
controlling an operation of a product pump to supply agricultural product to the outer and inner nozzle assemblies;
controlling an operation of a nozzle valve of the outer nozzle assembly to regulate a first flow rate of the agricultural product through the outer nozzle assembly;
controlling an operation of a nozzle valve of the inner nozzle assembly to regulate a second flow rate of the agricultural product through the inner nozzle assembly;
receiving, with a sensor, data indicative of a boom arm movement in a fore-aft direction from a default axis; and
altering at least one of the first flow rate or the second flow rate of the agricultural product when the movement of the boom arm deviates from a predefined range.

15. The method of claim 14, wherein altering at least one of the first flow rate or the second flow rate of the agricultural product when the movement of the boom assembly deviates from a predefined range comprises calculating the movement of the boom arm based on a boom arm movement magnitude.

16. The method of claim 14, wherein receiving data indicative of a movement of the boom assembly in the fore-aft direction comprises receiving data indicative of a maximum offset of the outer and inner nozzle assemblies from the default axis.

17. The method of claim 14, further comprising:
storing previous boom arm movement data; and
predicting oncoming movement of the boom arm based on the previous boom arm movement data.

18. The method of claim 17, wherein altering at least one of the first flow rate or the second flow rate of the agricultural product when the movement of the boom arm deviates from the predefined range comprises preemptively adjusting the at least one of the first flow rate or the second flow rate based on the previous boom arm movement data.

19. The method of claim 14, wherein the inner nozzle assembly is positioned inboard of the outer nozzle assembly, and wherein the altering at least one of the first flow rate or the second flow rate of the agricultural product when the movement of the boom arm deviates from the predefined range comprises increasing the first flow rate to be greater than the second flow rate.

\* \* \* \* \*